United States Patent
Mäkelä et al.

[11] Patent Number: 6,047,196
[45] Date of Patent: *Apr. 4, 2000

[54] COMMUNICATION DEVICE WITH TWO MODES OF OPERATION

[75] Inventors: Jarmo Mäkelä; Arto Lehtonen, both of Tampere; Veli-Matti Soini, Tarttila; Lasse Siitonen; Risto Rönkkä, both of Tampere, all of Finland

[73] Assignee: Nokia Mobile Phones, Ltd., Salo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/654,846

[22] Filed: May 29, 1996

[30] Foreign Application Priority Data

Nov. 24, 1995 [FI] Finland ................... 955682

[51] Int. Cl.⁷ .................................................. H04M 1/00
[52] U.S. Cl. ..................... 455/556; 455/90; 455/566; 455/575
[58] Field of Search ............... 455/90, 128, 556, 455/566, 552, 575, 557; 379/433, 434, 438, 447, 428, 440

[56] References Cited

U.S. PATENT DOCUMENTS

| | | | |
|---|---|---|---|
| 5,257,397 | 10/1993 | Barzegar et al. | 455/557 |
| 5,335,276 | 8/1994 | Thompson et al. | 380/21 |
| 5,422,656 | 6/1995 | Allard et al. | 455/556 |
| 5,491,507 | 2/1996 | Umezawa et al. | 455/566 |
| 5,526,411 | 6/1996 | Krieter | 379/433 |
| 5,646,649 | 7/1997 | Iwata et al. | 455/575 |
| 5,692,046 | 11/1997 | Jambhekar | 379/433 |
| 5,715,524 | 2/1998 | Jambhekar et al. | 455/90 |
| 5,742,912 | 4/1998 | Nishiyama et al. | 455/566 |
| 5,797,089 | 8/1998 | Nguyen | 455/556 |

FOREIGN PATENT DOCUMENTS

| | | |
|---|---|---|
| 0 472 361 A2 | 2/1992 | European Pat. Off. . |
| 0 678 987 A1 | 10/1995 | European Pat. Off. . |
| 4108169 A1 | 9/1991 | Germany . |
| 2 291 560 | 1/1996 | United Kingdom . |

*Primary Examiner*—Daniel S. Hunter
*Assistant Examiner*—Thuan T. Nguyen
*Attorney, Agent, or Firm*—Perman & Green, LLP

[57] ABSTRACT

The invention relates to a mobile station which comprises two separate user interfaces and an outer covering (10, 11) which can be unfolded. The device has the appearance and the size of a common mobile phone when the outer covering (10, 11) is closed, whereby available is a first user interface being substantially a telephone user interface. When the outer covering (10, 11) of the device is unfolded it exposes a second user interface having a relatively large-sized display (12) and an alphanumeric keypad (15). Alphanumeric messages and graphical information can be transmitted and received using the second user interface.

17 Claims, 5 Drawing Sheets

COMMUNICATION DEVICE WITH TWO MODES OF OPERATION

The present invention relates generally to personal electrical communication devices and particularly to a mobile station which can transmit both speech and alphanumeric messages.

Mobile phones acting as cellular system terminal devices have rapidly become quite common, and we can assume that in the future almost everybody will have a communication device, which is suitable to be carried anywhere and with which it is possible to call other corresponding devices within the coverage area of the respective system, on a world-wide basis when required. For the present a major part of the mobile phones have been expressly telephones, or in the first place they were intended to transmit speech connections. In digital systems it has become possible to transmit also short alphanumeric messages between the mobile phones. Another story completely are the wire-connected combinations formed by a mobile phone, a data interface and a portable computer, which can be used to transmit through the cellular system any digital data processed by the computer.

From the publication "Portable Communication" by Peter E. Jackson and David A. Deas, Proceedings of the National Communications Forum, 42 (1988), Sept. 30, No. 2, Chicago, Ill., USA, it is known a personal message communication device according to FIG. 1, where a device 1 resembling a modern mobile phone has both a numerical keypad 2 and an character keypad 3. From the text of the publication it is evident that it expressly refers to a mobile terminal of a wide-area communication system, where the terminal can freely move within the coverage area of the system and where the system monitors the terminal's position so that it can correctly route calls to a certain terminal device. In said reference publication the device 1 is presented at an outline level, and there is no detailed description of its structure or functioning. The usability of the presented device is particularly complicated by the small size of the keypads, which obviously was used aiming at generally small overall dimensions.

From the patent publication U.S. Pat. No. 5,337,346 it is known a mobile phone having a numerical keypad which can be turned to one side, revealing a larger alphanumeric keypad below it. However, in such a solution the display of the device must be made so small that only a very short alphanumeric message will fit in it, in order to have a size which is at least reasonably readable. In said publication the object of the invention is said to be a mobile phone, which can include an electronic notebook function, and it is proposed that the power supply to the device's radio sections is switched off when the notebook function is used. Corresponding solutions are known from several television remote controls, whereby the user, by unfolding the outer covering of the device or a part of it, can enlarge that user interface, e.g. the keypad, of which only a small part is visible when the outer covering is closed.

The objective of this invention is to present a personal mobile station which can transmit information between users in a more flexible way than earlier. An objective of the invention is also to present a device of said type, which is easy to use and well suited as a mobile terminal of a cellular system. A further objective of the invention is to present a device which can transmit both voice and versatile graphical information between users.

The objectives of the invention are achieved by a device comprising the radio sections of a cellular system terminal and comprising two separate user interfaces, of which the first is intended for the transmission of telephone services and the second for the transmission of alphanumeric messages and other services requiring graphical information. The first user interface is located on the outer surface of the device and the second within the device, so that it can be exposed by unfolding the device in at least two parts, in a way intended for this purpose.

The portable communication device according to the invention is characterized in that it comprises a separate first user interface and a separate second user interface to realize the interaction between said communication device and the user, whereby said first user interface comprises first input means and first indicator means and said second user interface comprises second input means and second indicator means. The communication device of another embodiment according to the invention is characterized in that it comprises a separate first user interface and a separate second user interface to realize the interaction between said communication device and the user, whereby said first user interface is substantially a telephone user interface for the transmission of two-way speech and comprises a microphone, a speaker and first input means to control the operation of the device and to enter data into the device, and whereby said second user interface comprises second input means and indicator means.

During the development work leading to the invention we observed that when we continuously try to reduce the size of the mobile stations the small outer dimensions already begin to complicate the use of the devices. The user interface, or a certain entirety formed by parts which are designed for the interaction between a user and the device, should be designed so that regardless of the small size of the device itself a clumsy user, even with large hands, can manage the depression of buttons and other required operations without the training of a watchmaker. The disadvantages of the small size are particularly clearly seen in the device according to FIG. 1 representing the prior art and having buttons only a few millimeters wide and spaced about one millimeter from each other, judging from the size of the pencil which is shown to illustrate the scale.

The mobile station according to the invention has two separate user interfaces, which are independent regarding the use of the mobile station, i.e. they can be used independently of each other. The first user interface is located on the outer surface of the device and resembles the user interface of present-day mobile phones with a microphone, a speaker, a keypad and a small alphanumeric display. It is intended to be used in the same way as known user interfaces of present-day mobile phones. Because the whole outer surface of the device is available for the realization of this user interface, it can be made large enough so that it is easy to use. However, it is preferable that the keyboard and display means of the first user interface are located on only one side of the outer surface, so that they can be controlled with one glance. In order to use the second user interface the mobile station according to the invention can be opened by unfolding preferably two halves hinged to each other and having at their inner surfaces a larger display, a complete alphanumeric keypad and function keys, which then become visible and available to the user. A space with the size of two times the cross section of the device is available to realize the second user interface, whereby it also can be made large enough to make it easy to use, as was emphasized above.

Below the invention will be described in more detail with reference to the preferred embodiments shown as examples and to the enclosed figures, in which.

Figure 1:
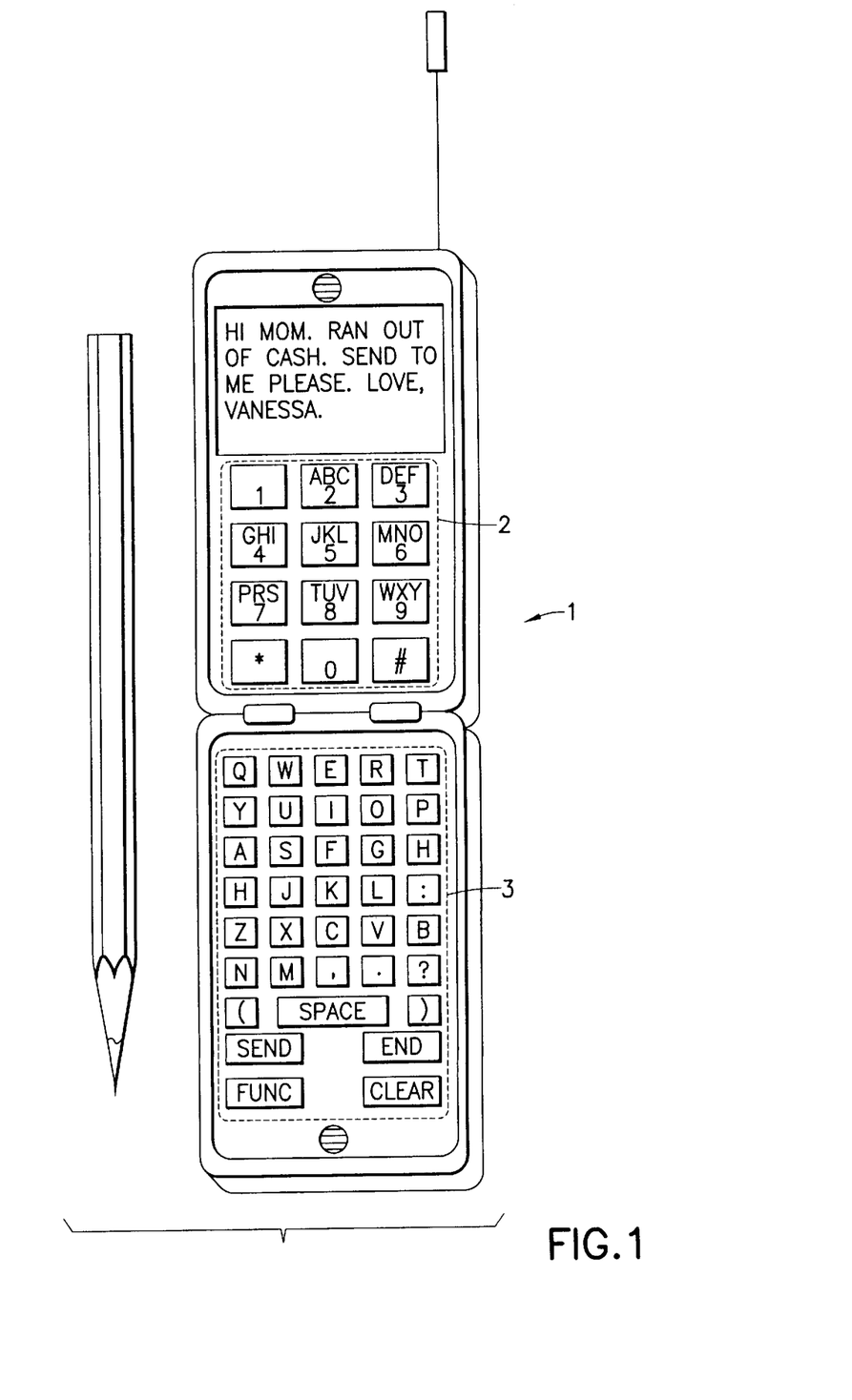
FIG. 1 shows a prior art mobile station.

Above we referred to FIG. 1 when describing prior art, and thus in the description of the invention and its preferred embodiments we refer mainly to FIGS. 2 to 6. In the figures we use the same reference numbers for corresponding parts.

Figure 2:
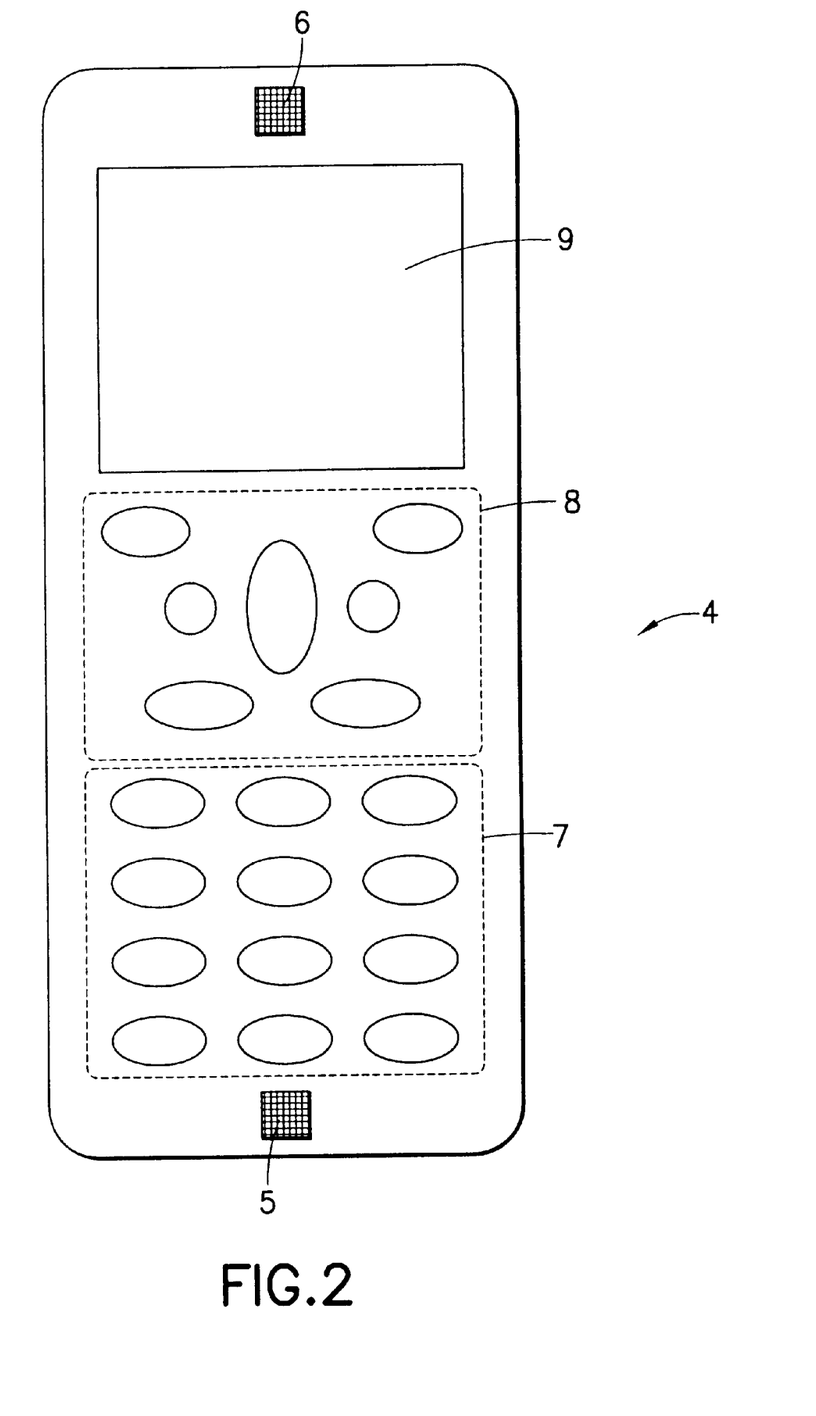
FIG. 2 shows schematically the first user interface of a mobile station according to a preferred embodiment of the invention.

FIG. 2 shows schematically a mobile station 4 according to the invention seen from above, so that its first user interface is visible. The presented first user interface is quite similar to that of present-day mobile phones according to prior art, of which we can mention as an example the GSM phone model 2110 manufactured by Nokia Mobile Phones Ltd. The first user interface comprises a microphone 5, a speaker 6, a numerical keypad 7, control keys 8 and a rather small alphanumeric display 9. They are realized with components similar to those of prior art mobile phones, and they are used to create a telephone connection through the cellular radio system to another mobile station, in the same way as in known mobile phones. With them it is further possible to realize certain supplementary functions of call set-up, such as finding telephone numbers and names in the memory of the mobile station. The first user interface according to the invention can comprise also other parts than those of the embodiment example shown in FIG. 2, but they will not substantially change the purpose nor the use of the interface.

Figure 3:
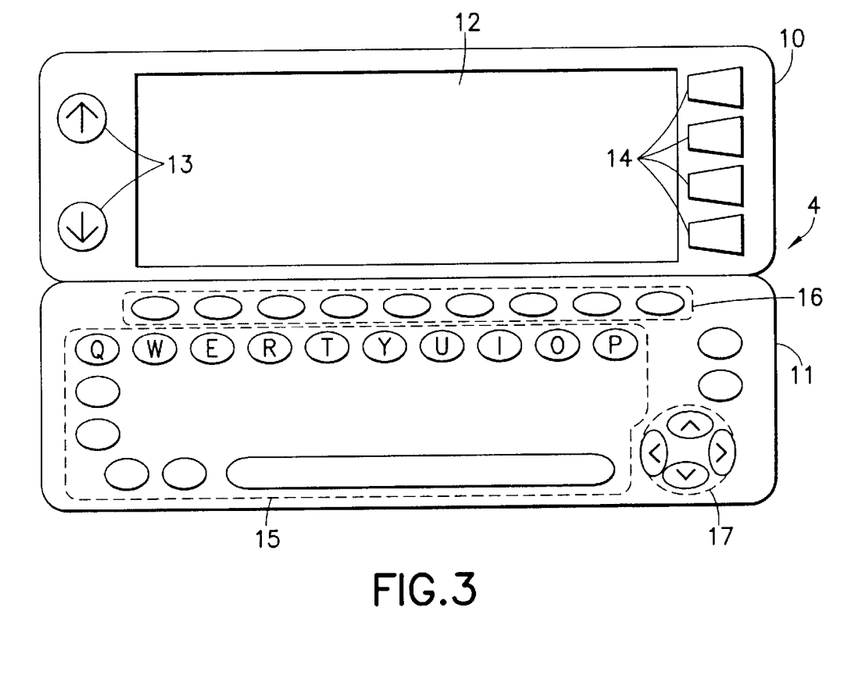
FIG. 3 shows schematically the second user interface of a mobile station according to a preferred embodiment of the invention.

In order to expose the second user interface the mobile station 4 according to the invention is opened. FIG. 3 shows a mobile station 4 according to a preferred embodiment of the invention when it is unfolded, so that its two halves 10 and 11 hinged along the long side are turned so that they form an angle over 90 degrees, preferably to an angle of 135 degrees. The opening angle is determined by the fact that when the device is unfolded it should be as easy to use as possible: the keypad parts of the second user interface should be easily accessible and according to their design the display parts should be located in an optimal angle relative the direction of the user's eyes when the device is in a typical position of use, e.g. in the lap or on a table. It is further advantageous that the mobile station 4 according to the invention will remain, also when it unfolded, in a certain position on a table or any other even surface, which has an effect on the opening angle. In another preferred embodiment the halves 10 and 11 can be turned 180 degrees relative each other, whereby a plate-like structure is obtained.

In the preferred embodiment shown in FIG. 3 the first half 10 comprises on its visible side a display 12, which occupies almost the whole area of the half 10. On the edge areas outside the display the half 10 comprises scrolling keys 13 and command keys 14. In this embodiment the second half 11 comprises only keys. The largest group of keys forms a complete alphanumeric keypad, or a so called QWERTY keyboard 15, in which the alphanumeric keys are preferably in the same standard order that is used in the keyboards of computers and typewriters. This is an advantage because the user doesn't have to learn any new key order, characteristic of the device according to the invention. Further the second half 11 preferably comprises application keys 16, on which there can be seen the names of certain applications, and four arrow keys 17.

The large-sized display 12 shown in FIG. 3 preferably is a liquid crystal display, having a resolution of e.g. 640×200 picture elements or pixels. The manufacturing of such displays is a technology known per se. The display 12 can be provided with a touch sensitive film or any corresponding arrangement known per se, with the aid of which it can be used as a data input device by touching its surface at certain points. All keys 13, 14, 15, 16, 17 shown in FIG. 3 are preferably push buttons of the same type as the keys used in present-day mobile phones and/or in so called palmtop or hand-held computers.

Below we describe the purpose and the use of the different key groups. The scrolling keys 13 are intended to move the selection bar in the display, in other words, when the display 12 during use shows a list of optional alternatives and one or several of them are objects to be selected at a time, the selection mark (or marks) showing this will move forwards or backwards when the scrolling keys 13 are depressed. The command keys 14 are so called program dependent keys (softkeys), in other words each of them can select a certain command, which is shown in the display 12 at the location of the respective command key 14. The commands can vary according to the functional status of the device and the program controlling the device. In the preferred embodiment certain often used commands, such as "delete" and "close", are preferably always associated with the same command key 14.

The alphanumeric keys 15 are used to enter alphanumeric characters to the device 4. The same keypad can be used to enter messages in different languages, even when different languages require certain special characters. They are preferably generated so that several characters, e.g. a-ä-å, are assigned to certain keys, so that each character in its turn appears in the display 12 when the user has pushed the respective alphanumeric key and then pushes once or more times a certain special key, a so called "character" key.

Another alternative is that each character a-ä-å assigned to a certain alphanumeric key is displayed in sequence when the user rapidly pushes the respective key several times in a sequence, or keeps the key continuously depressed. It is obvious to a person skilled in the art that also other corresponding methods can be used to assign several characters to the same alphanumeric key. Preferably the keypad 15 has indications about which special characters are assigned to each key.

The application keys 16 are preferably associated with the selection of certain applications, for instance so that when the user depresses a certain application key he sets the device in a state where he can begin the transmission of an alphanumeric message, and when he depresses a certain other application key the state changes so that he can update telephone numbers stored in the memory means (not shown in the figures) of the device 4, and so on. Certain shortcut functions, or macros, can also be assigned to certain application keys 16, such as "delete 10 oldest messages in the memory" or corresponding functions. One application key could be a so called special function key, the depression of which opens more applications. Thus the number of application keys 16 will not limit the number of possible applications used in the device 4. In a preferred embodiment the execution of each application is continued from that point where it was interrupted when said application was last active. With the aid of the arrow keys 17 the user can control the cursor moving in the display 12, or supply the device 4 with other information relating to graphical functions, e.g. draw simple line drawings.

Figure 4:
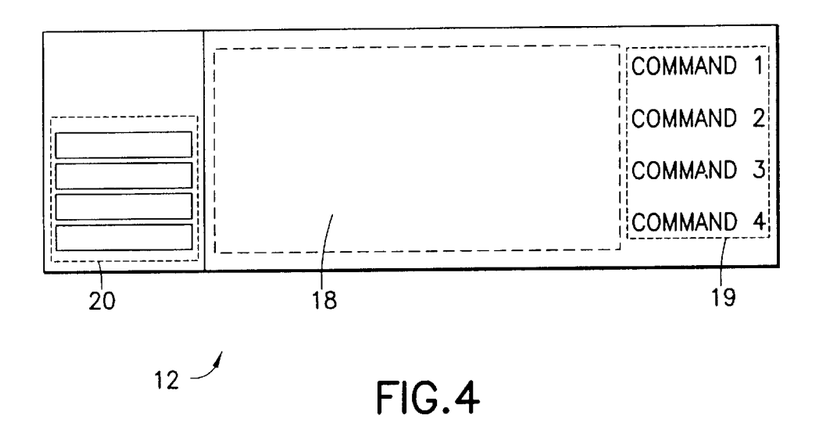
FIG. 4 shows in more detail a part of the user interface shown in FIG. 3.
Figure 5:
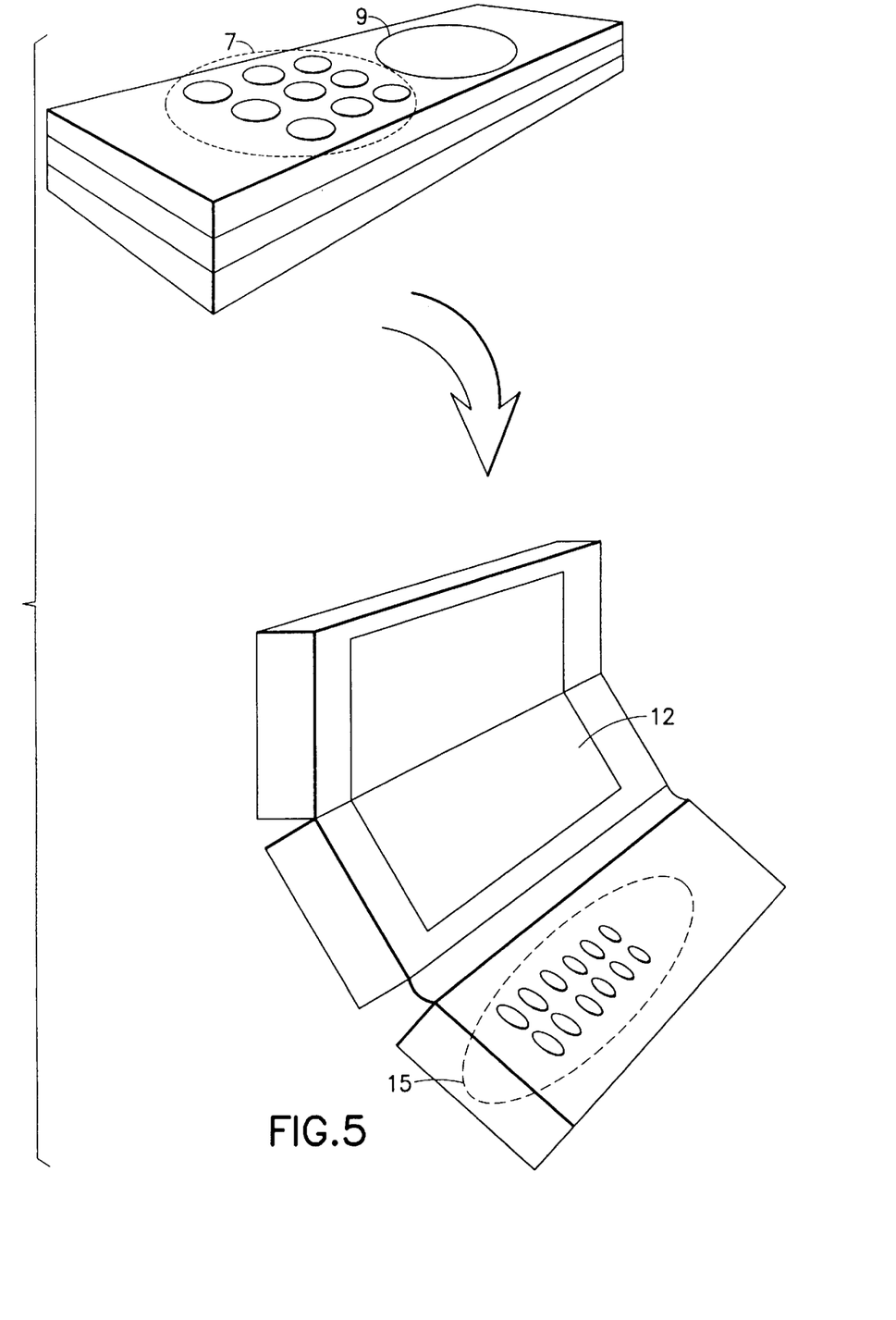
FIG. 5 shows in a perspective view another preferred embodiment of the invention.
Figure 6:
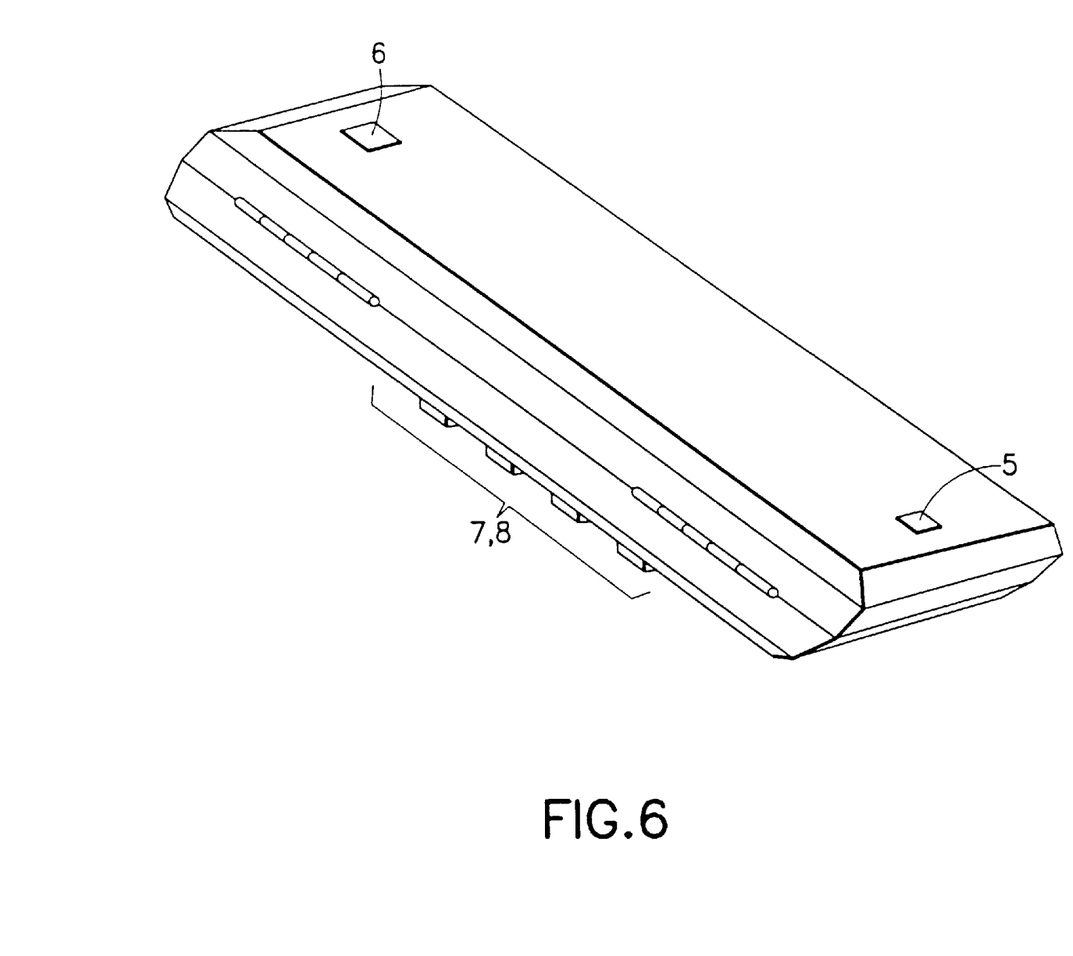
FIG. 6 shows in a perspective view a further preferred embodiment of the invention.

FIG. 4 shows in an embodiment example how the display 12 is divided into functional regions. At the center of the display there is an input and output region 18, which is used to communicate alphanumeric and other graphic information to the user. For example, the text will be displayed in this region when the user writes an alphanumeric message and intends to transmit it to another user. Correspondingly, the device displays the contents of the message in the input and output region 18 when the device 4 has received a message containing graphical information and the user wants to read said message. At the right edge of the display 12 there is a command region 19, which typically displays commands corresponding to the command keys 14 which are outside the edge of the display 12 and shown in FIG. 3. Then the user will know which command execution corresponds to a depression of each command key 14. The left border region 20 of the display 12 can contain a list of optional actions which can be scrolled using the scrolling keys 13. The region 20 can preferably also be used as an indicator region, which by simple symbols presents to the user information about the device 4, such as the charge status of the battery which functions as the power supply (not shown in the figures), and the cellular radio network's local field strength measured by the device 4. The display can further show the time and the date, a reminder of received messages, possibly the location of the device within a certain rate area, and so on. The division of the display 12 into functional regions is presented only as an example and it is obvious to a person skilled in the art that the display 12 can also be divided in many other ways.

The use of the device 4 according to the invention is briefly described below. The use of the device with the aid of the first user interface shown in FIG. 2 in order to utilize the common mobile phone services does not differ from the use of presently known mobile phones, so that in the description below we mainly discuss operation with the aid of the second user interface shown in FIG. 3. The description is intended to be an example, and its details do not limit the invention.

Let us assume that the user wants to send a text message to another user with the device 4. First he unfolds the device 4 so that it is in the position shown in FIG. 3. He starts a function called "message transmission" by depressing a certain application key 16, whereby a list of commands is displayed at the right edge region 19 of the display 12 containing items Receiver, Message, Transmit. The user depresses that command key 14 at which there is the Receiver command, whereby he will be able to scroll a list of receiver names and connection numbers stored in the memory means of the device. The user selects a certain receiver with the arrow keys 17 and then he depresses the command key 14 at which there is the Message command. Now using the keypad 15 he can enter a desired alphanumeric message in the display 12. With a sharp pointed drawing tool he can also draw on the surface of the display figures accompanying the message, if the display 12 is provided with a touch sensitive film. At the same time the message is stored in the device's memory means, from where it can be read during the transmission step.

When the user considers the message to be complete he depresses the command key for the Send command, or e.g. a certain application key 16 with a function specified as transmission of the message. The microprocessor (not shown in the figures) controlling the operation of the device 4 reads from the memory means the message written and/or drawn by the user and transforms it into a form in which it can be transmitted through the cellular radio network. A transform of this kind is known e.g. from present-day portable telefax devices. A finished message is transmitted using the device's RF sections (not shown in the figures) to the cellular radio network and thence further to the receiver's terminal device. A cellular radio network base station (not shown in the figures) preferably acknowledges the successful transmission of the message by sending an acknowledgment message to the mobile station 4. The receiver's terminal device can also automatically return information about a successful reception of the message, whereby the device 4 can notify the user about this, either automatically or as a response to an inquiry made by the user using a certain application key 16.

If the user makes a mistake or acts in a way, which for any reason is not allowed by the device 4, or which requires a specification, the device preferably reports this in a "balloon" displayed in the display 12 and telling the user what to do. A typical situation is such where several telephone numbers have been stored for the same receiver and the user must specify the number to which he primarily wants the message to be sent.

The two user interfaces of the device 4 according to the invention, which are separately shown in FIGS. 2 and 3, are independent in that sense that the user can use them independently of each other. However, the same internal parts related to the operation of the device are used through them, such as the memory means, which store a database containing receiver names and telephone numbers often used by the user. In this way we avoid confusion which could be caused by data that were updated in different ways through different user interfaces. The invention does not limit a simultaneous use of the user interfaces. For instance, during a call the keypad and the display of the second user interface could be used as an electrical notebook, in which the user can store important information he gets during the call, or as a calendar, in which the user during a call can check data relating to his time schedule.

All auxiliary functions which are used in modern mobile phones could of course be included in the device according to the invention. The device can e.g. have a connector (not shown in the figures), to which it is possible to connect a portable computer through a data adapter in order to form a digital modem connection through the radio medium in a cellular radio network. The device can also have an internal fax modem, whereby it can send and receive telefaxes, whereby the large-size display 12 facilitates the writing and reading of the telefaxes. Further, because the second user interface of the device 4 according to the invention comprises a display 12 and a keypad 15, the device 4 can be preferably used as a small computer terminal via a suitable data communication path, whereby this terminal emulates e.g. a VT 100 terminal in a way known per se, when it is connected to another computer. A preferable way to arrange the communication between the device 4 according to the invention and a certain other device, such as a PC or a printer, is to use an infra-red link, where both the device 4 and the other device comprise infra-red receiving and transmitting means. It is a well known technology per se to realize a communication path based on the infra-red link between a mobile station and a computer. For example, the programs stored in the memory means of the device 4 can be updated through this link.

If the memory means and microprocessor of the device according to the invention have a sufficiently high capacity, it is possible to install in it also other applications which utilize the characteristics of the device 4 as a small portable computer. An example of such an auxiliary application could be a pocket calculator program, which in view of the large display 12 would be able to process mathematical information containing even complicated graphical information, in the same way as e.g. the known scientific calculators manufactured and marketed by Hewlett-Packard Company. Another example of an auxiliary application could be an electronic dictionary, which, from the databases stored in the memory means of the device, could find foreign language equivalents of words input by the keypad 15. The device can also automatically or at the request of the user translate simple messages e.g. into English when the device detects that the country code of the receiver's telephone number represents a country where English is spoken. Such auxiliary functions are programmed processes known per se, which can be stored in the memory means of the device 4 in such a format that can be executed by the microprocessor controlling the operation of the device.

The stability of the device according to the invention, when opened and placed on a table or a similar even surface during the use of the second user interface, plays a significant role in the ease of use that the user experiences. It is preferable that the second half of the device, that is, the one which includes the large alphanumerical keyboard that is visible when the device is open, is heavy enough to keep the opened device balanced. A suitable distribution of mass is achieved by placing a majority of the heaviest structural parts in said second half. An advantageous embodiment of the invention includes in the second half for example the microphone and the speaker that functionally belong to the telephone interface, as well as the radio frequency transceiver parts and most of the electronics that realize the operations of the second user interface. When reference is made in this patent application to the fact that the telephone microphone and speaker are parts of the first user interface (the telephone interface), which is located substantially on the outer surface of the device, it should be understood that the microphone and speaker may actually be inside the device, as long as the outer surface has suitable openings to act as means for channelling sound to the microphone and from the speaker. In the embodiment described above with the microphone and speaker in the second half, these openings 5 and 6 may be on the other side of the (closed) device than the rest of the telephone interface parts 7, 8, like in FIG. 6.

According to the inventive idea related to the presented invention a small-sized mobile phone can be provided with auxiliary functions requiring a larger user interface, so that the device is foldable and that the larger user interface is found within the device. With reference to FIGS. 2 to 4 above we discussed an embodiment in which the device unfolds as two parts. According to the same inventive idea the device could also be made so that it unfolds in three parts according to FIG. 5, or in still more parts in other embodiments. For example in the embodiment shown in FIG. 5 the large display 12 of the device comprises two sections, whereby we obtain a total display area, which corresponds to about twice the cross section of the folded device, and still there is room for a complete QWERTY keyboard 15. A person skilled in the art can easily design further alternative embodiments, in which the display and keypad sections are divided in different ways on the surfaces of the unfolding sections of the device according to the invention.

It is known that a user interface of the mobile phone type corresponding to the first user interface of the invention presented above can also be realized without a display. In one embodiment of the present invention, where we aimed at minimal production costs, the first user interface comprises only a microphone, a speaker and a numerical keypad. The first user interface could even be only a pager, whereby it does not contain any microphone or speaker, but contains a small display. Then of course it is not possible to make any calls with the device.

Speech, telefaxes and graphical information between users can be communicated with the device according to the invention, which already may be considered as quite versatile communication, taking into account that the device according to the invention resembles a common mobile phone regarding its size and appearance. The device is easy to use, which is particularly enhanced by the fact that it has a telephone user interface which is the same as in an ordinary mobile phone, and the parts belonging to its user interfaces are of a sufficiently large size. The familiar QWERTY order of the alphanumeric keypad also represents the easy to use features.

What is claimed is:

1. A portable communication device (4) for transmitting information in electrical form between a user and a certain data communication system, characterized in that it comprises:

an outer covering (10, 11) including upper and lower halves which can be moved between a folded condition and an unfolded condition by actions of the user, said lower half (11) containing the heaviest structural parts of said portable communication device including a microphone (5), a speaker (6), and sound channelling means for directing sound to the microphone from the speaker, said lower half (11) being substantially heavier than said upper half (10); and in order to realize the interaction between said communication device (4) and the user, as separate items:

a first user interface in said lower half (11) with first input means (5, 7, 8) and first indicator means (9); and a second user interface in said upper half (10) with second input means (13, 14, 15, 16, 17) and second indicator means (12);

of which said first user interface comprises parts (5, 6, 7, 8, 9), which are located substantially on the outer surface of said outer covering (10, 11), so that they can be used when said upper and lower halves are in the folded condition, and of which said second user interface comprises parts (12, 13, 14, 15, 16, 17), which are located substantially inside said outer covering (10, 11), so that they can be used when said upper and lower halves are in the unfolded condition, said portable communication device being balanced for firm placement of said lower half (11) of said outer covering on a substantially flat level surface, with said upper half (12) of said outer covering positioned such that the included angle between said lower half and said higher half is less than 180°.

2. A communication device (4) according to claim 1, characterized in that said first and second user interfaces can be used independently of each other.

3. A communication device (4) according to claim 1, characterized in that said first user interface is substantially a telephone user interface for the two-way transmission of speech and comprises sound channelling means (5, 6) for directing sound to a microphone and from a speaker, and keys (7, 8) to control the operation of the device (4) and to enter data into the device.

4. A communication device (4) according to claim 3, characterized in that said outer surface of said outer covering comprises a first side and a second side, and said sound channelling means (5, 6) are located on said first side and said keys (7, 8) are located on said second side.

5. A communication device (4) according to claim 1, characterized in that said outer covering (10, 11) comprises a first part (10) and a second part (11) which are substantially equally large in cross section and connected to each other by a hinge joint, so that they are located substantially against each other when said outer covering is closed, an so that in order to unfold said outer covering they are turned apart around the rotational axis of said hinge joint.

6. A communication device (4) according to claim 1, characterized in that said second user interface comprises a display (12) for the presentation of alphanumeric and/or graphical information, and keys (13, 14, 15, 16, 17) to control the operation of the device and to enter data into the device.

7. A communication device (4) according to claim 6, characterized in that said first part (10) comprises said display (12), and that said second part (11) comprises the largest part of said keys (15, 16, 17).

8. A communication device (4) according to claim 6, characterized in that said second user interface comprises at least one scrolling key (13) for scrolling the information in said display (12).

9. A communication device (4) according to claim 6, characterized in that said second user interface comprises at least one command key (14) for entering commands to the device with the depression of one key.

10. A communication device (4) according to claim 6, characterized in that it comprises means for the execution of application programs and that said second user interface comprises application keys (16) for the selection of a certain application program with the depression of one key.

11. A communication device (4) according to claim 6, characterized in that it comprises a fax modem for transmitting and receiving telefaxes through said communication system.

12. A communication device (4) according to claim 6, characterized in that said display (12) comprises means for the communication of graphical information to the device (4) by touching said display (12) at a specified position.

13. A communication device (4) according claim 1, characterized in that said second user interface comprises about 30 character keys (15), which are arranged substantially according to a certain established keyboard order.

14. A portable communication device (4) for transmitting information in electrical form between a user and a certain data communication system, characterized in that it comprises separate first and second user interfaces in order to realize the interaction between said communication device (4) and the user, of which said first user interface is substantially a telephone user interface for the two-way transmission of speech and comprises sound channelling means for directing sound to a microphone (5) and from a speaker (6), and first input means (7, 8) to control the operation of the device (4) and to enter data into the device and first indicator means (9), and of which the second user interface comprises second input means (13, 14, 15, 16, 17) and second indicator means (12) and further including an outer covering (10, 11) including upper and lower halves which can be unfolded by actions of the user, said lower half (11) containing the heaviest structural parts of said portable communication device including a microphone (5), a speaker (6), and sound channelling means for directing sound to the microphone from the speaker, said lower half (11) being substantially heavier than said upper half (10), said portable communication device being balanced for firm placement of said lower half of said outer covering on a substantially flat level surface, with said upper half of said outer covering positioned such that the included angle between said lower half and said higher half is less than 180°.

15. A communication device (4) according to claim 14, characterized in that it comprises an outer covering (10, 11) which can be unfolded by actions of the user, and that said first user interface comprises parts (5, 6, 7, 8, 9), which are located substantially on the outer surface of said outer covering (10, 11), so that they can be used without unfolding said outer cover, and that said second user interface comprises parts (12, 13, 14, 15, 16, 17), which are located substantially inside said outer covering (10, 11), so that they can be used when said outer covering is unfolded.

16. A communication device (4) according to claim 15, characterized in that said sound channelling means (5, 6) are located in a first part of said outer covering and said first input means (7, 8) are located in a second part of said outer covering.

17. A communication device (4) according to claim 14, characterized in that said first and second user interfaces can be used independently of each other.

* * * * *